Figure 1:
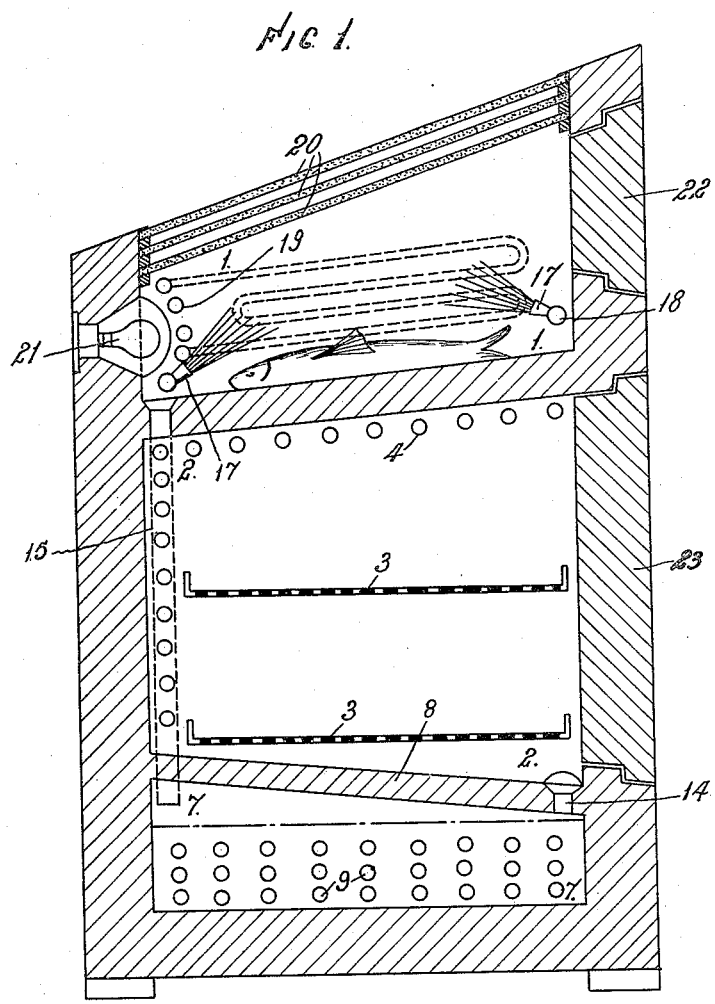

March 26, 1935.   M. T. ZAROTSCHENZEFF   1,995,729
PRESERVATION OR KEEPING AND DISPLAY OF FOOD SUBSTANCES
Filed Jan. 13, 1932   2 Sheets-Sheet 1

Inventor
M.T. Zarotschenzeff
by [signature]
Atty.

March 26, 1935. M. T. ZAROTSCHENZEFF 1,995,729
PRESERVATION OR KEEPING AND DISPLAY OF FOOD SUBSTANCES
Filed Jan. 13, 1932 2 Sheets-Sheet 2
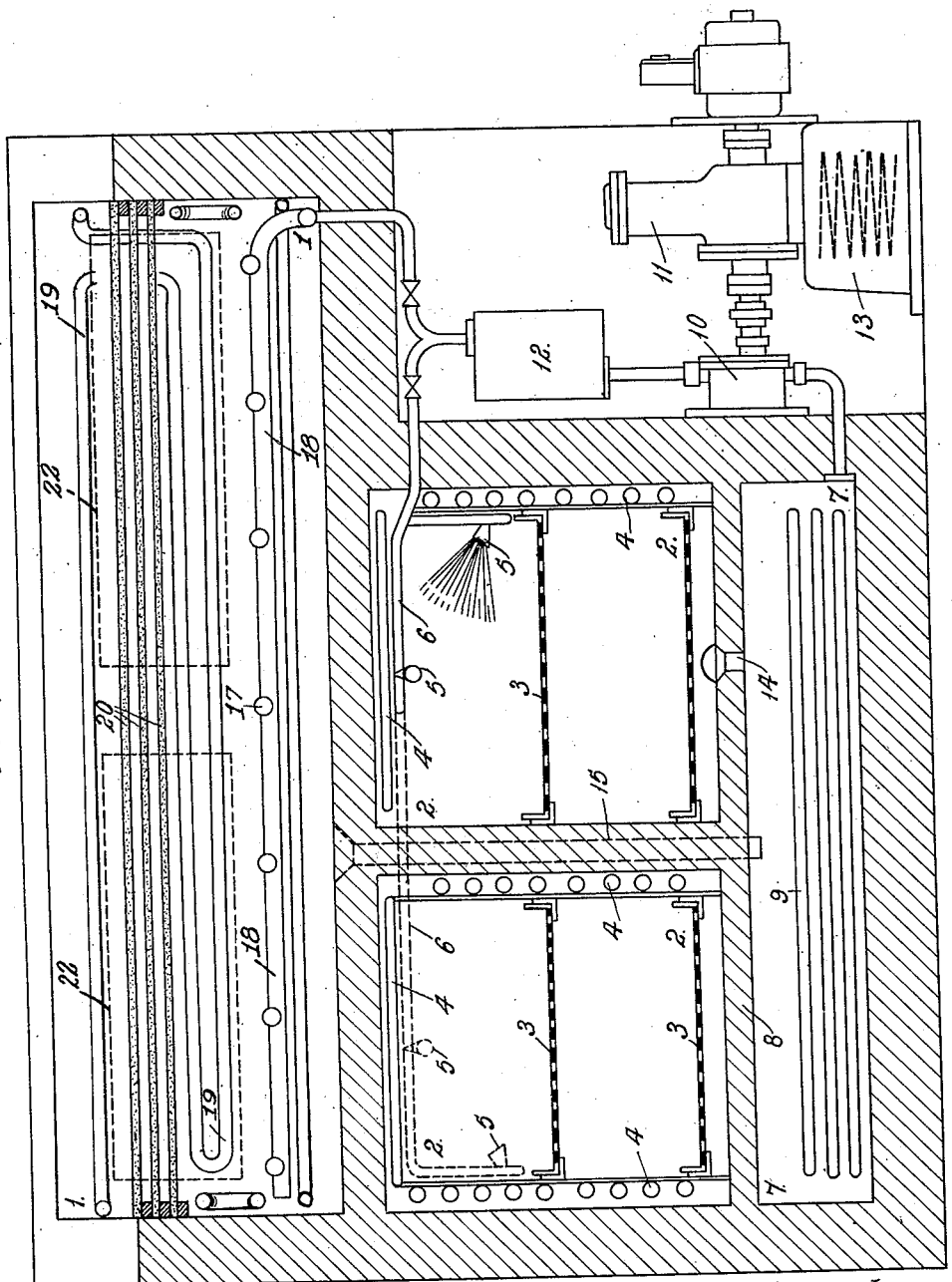
Inventor
M. T. Zarotschenzeff Patented Mar. 26, 1935

1,995,729

UNITED STATES PATENT OFFICE 1,995,729

PRESERVATION OR KEEPING AND DISPLAY OF FOOD SUBSTANCES

Mikail Trofim Zarotschenzeff, London, England, assignor to American "Z" Corporation, New York, N. Y., a corporation of New York.

Application January 13, 1932, Serial No. 586,424
In Great Britain January 24, 1931

8 Claims. (Cl. 62—104)

This invention has reference to displaying or exhibiting, and the preservation of food substances, and more particularly animal food substances, especially fish; and it has primarily for its objects and effects to provide an improved display apparatus for use in shops, stores, and the like, so that the food is both displayed and preserved by cold in an hygienic and advantageous manner, so that the quality and condition desired in such foodstuffs is preserved; the apparatus being provided with glazed windows so that the foods can be easily seen and chosen.

The apparatus according to this invention comprises a food display chamber having a window or windows at the top or front, in which a wet cold fog atmosphere is maintained by the atomization of cold liquid; and a storing chamber below same and separate therefrom, wherein the goods can be stored more or less in bulk, and kept at a low temperature in a similar manner.

The fog is maintained at the chilling or freezing temperature required by the artificial refrigeration of the liquid to be atomized, or by this in conjunction with the employment of conduits in the chamber through which an artificially refrigerated fluid is passed, and in contact with which the fog atmosphere can freely come.

The fish to be kept and exhibited will be placed and lie on a table or surface of a suitable material, which may be inclined downwards somewhat from the back portion of the apparatus to the front, and the liquid to be atomized is supplied under pressure to atomizing nozzles in the chamber, and atomized and distributed and circulated, so that the atmosphere within it is in the form of a circulating or moving dense fog.

Some of the particles of liquid thus introduced in the form of fog in the keeping chamber will coalesce and form drops, and the liquid so formed will flow down, and be discharged from the chamber, and delivered to a tank or vessel wherein it may be artificially cooled or refrigerated by a cold medium of any suitable known kind.

The fish on the table or "counter" of the keeping chamber, will thus be in the presence of and in contact with this special dense cold fog atmosphere, which may be at or near or a few degrees above freezing point.

The liquid which is returned from the chamber and passes into the refrigerating tank or vessel, and is re-refrigerated or cooled, is returned to the keeping chamber by a suitable pump, and is prior to being re-atomized and re-delivered into the keeping chamber, purified or sterilized and purified, which can be effectively done by passing it through a charcoal or other sterilizing filter.

The atomizing nozzles or devices through which the water will be discharged, will be under such a pressure that will properly effect the atomization, and produce the fog condition required.

By this treatment or method, the fish on the table or supporting surface of the apparatus is kept constantly wet or moistened by the atomized liquid.

In operation, the door by which the fish can be introduced and taken out of the show case or treating chamber, can be adapted to control the supply of the refrigerated liquid to the atomizing nozzle devices by operating a cock on the supply pipe, so that when the door or flap is opened, the supply of cold liquid will be cut off, but is continued or turned on again automatically by closing the door or flap.

The store chamber for storing fish more or less in quantity, which will be subject to the action of the artificial refrigerating atmosphere, is provided with shelves or trays on which the fish can be stored, so that when the show or display case or keeping chamber proper requires replenishing, fish can be taken from the shelves of the store chamber and put into the display chamber or case. Thus a quantity of fish can always be stored in an atmosphere by which its quality, namely, flavour, structure and appearance or colour of fresh fish is preserved.

In some cases this store chamber may be fitted with atomizing nozzles or sprays as above described, by which the atmosphere of fog is produced in this chamber, so that the fish will be kept wet and cool in this chamber also.

Further, in some cases a system of pipes or vessels can be provided in the keeping and display chamber, and in the store chamber, or either of them, through which a refrigerating or cold fluid is passed, so that by it the cooling or refrigerating of the fog atmosphere is effected and maintained; and, in the case of the atomizing liquid being refrigerated prior to atomization, the cooling of the fog and the chamber will be augumented.

Brine or cold water will be circulated through these pipes, and serve as the cooling medium; or, a refrigerated "expanded" cold gas can be passed or circulated through them; and when a cold liquid, as brine or water, is passed through them, the liquid can be taken from the same source of supply as that for the atomizing nozzle or spraying devices, when such liquid is refrigerated before being atomized.

In some cases, in the preserving or keeping and display chamber or case, to prevent the glazed portions being fogged with condensed moisture, and thus obscure the vision, a plurality, say two or three thicknesses or laminæ of glass spaced closely together may be used to prevent this effect, and also an undue loss of cold.

The introduction of the atomized or sprayed liquid to the treating or exhibiting chamber or case can be continuous or intermittent; and when intermittently supplied this may be automatically effected by a working part of the machinery or otherwise.

While as stated, this method of keeping or the preservation of foodstuffs is especially applicable to fish of all kinds, it can also be used with advantageous effects in connection with the keeping or preservation and exhibiting of all species of animal foods, and also vegetable foods; and thus any kind of food can be kept in an hygienic condition, and of fresh and good quality; and this quality or condition is visible to customers and others in shops, stores, or otherwise.

By the atmosphere in which the food is kept being in the form of cold wet fog, the cold producing or cooling effect is relatively great, the thermal conductivity of the air or atmosphere being increased many-fold; and it is thoroughly distributed.

In some cases, liquid returning from the exhibiting and keeping chamber is ridded of particles of dirt, slime, mucus and other foreign matter, by passing it through a filter, which may be done before the liquid passes to the refrigerating tank or vessel in which it is artificially cooled or afterwards; or it may be done between this tank or vessel and the sterilizing filter; so that in the end, the liquid is cleansed from foreign matter, and is sterilized, and unpleasant smell is eliminated before being re-delivered into the keeping or exhibiting chamber or case.

The medium for cooling or refrigerating the water or brine may be of any known kind, as for instance, an "expanded" liquefied gas, which is delivered into and passed through conduits or chambers submerged in the refrigerating tank or vessel, and afterwards returned in a gasified or expanded form to a compressor, and compressed to the required degree, and in this condition passed through a cooler or condenser and liquefied, and then re-converted to the gaseous form by liberating by a suitable expanding valve or device. But any suitable or convenient method of or means for refrigerating the liquid which is used in the fog condition in the keeping chamber may be used.

The invention is illustrated in the annexed drawings, in which Figure 1 is a cross section, and Figure 2 a longitudinal section illustrating a fish or other preserving, displaying and storing apparatus.

In the case shown the apparatus comprises two general portions, namely, a store chamber below, in which the fish or foodstuffs are stored and kept refrigerated or frozen; and a displaying chamber above, in which the fish or food can be displayed and seen, and also at the same time kept at the cold temperature required.

The displaying chamber is generally designated 1, and in the lower portion of the apparatus which is the chilling or freezing store portion, there are two chambers 2; and it may be assumed that one of these chambers may be used for storing fish or other foodstuffs at a temperature at which they are "chilled", and the other where the foodstuffs are frozen, the use of the one or other temperatures depending upon the use of the foodstuffs, and the appropriateness of the cooling method adopted.

In these lower cold or refrigerating chambers 2 there are trays 3, on which the fish or materials to be stored and refrigerated are carried, and around the walls or some of them are installed pipes 4 through which refrigerating fluid is passed in the known way, and which may be of any suitable kind, the amount of surface and temperature of the fluid being governed by the temperature required in the chamber, as the case may be.

There is produced and maintained in these chambers 2, an atmosphere consisting of dense fog produced by the atomization of a suitable liquid, such as water or a brine which is suitable; and this atomization is effected by suitable spray jet nozzle devices 5, fixed on pipes 6 to which the liquid is supplied under a suitable pressure such as will cause the atomization, and the dense fog and air atmosphere produced; and as these nozzles or atomizers produce sprays or jets of the atomized liquid, they cause strong currents or streams of the fog atmosphere to flow throughout the chamber, and over and in contact with the articles to be chilled or frozen, as the case may be.

In the example of apparatus shown, there is below the chambers 2 another chamber 7 separated by the wall 8 forming the floor to the chambers 2, and a roof to the chamber 7; and in this chamber are pipes 9 through which a refrigerating fluid similar to that passed through the pipes 4 is passed, so that the liquid contained in this chamber 7 is refrigerated and is forced by a pump 10 driven by a compressor engine 11, up to the nozzles 5, it being filtered on its way by passing up through a charcoal or other suitable filter 12.

The engine 11 in the case shown is mounted on the top of a condenser or cooler 13, in which a compressed gas, produced by the pump, is passed and condensed, after which it is as usual released and expanded in the various refrigerating tubes in the apparatus for the production of cold.

Any liquid that falls down to the bottom of the chambers 2 may pass from same to the chamber 7 by pipes 14 in the floor 8; and similarly, any liquid that falls on to the floor of the chamber 1 can pass by a conduit 15 into the refrigerating chamber 7.

Regarding the display chamber 1, and for atmosphere is created and maintained in this chamber, similarly as in the chambers below, the liquid being atomized by nozzles 17 on the pressure liquid supply pipes 18; and in this case it is seen, that the pipes 18 are disposed in the two lower atomizing angles of the chambers and that the atomizing nozzles 17 are so placed that they project sprays of atomized liquid, which becomes a dense wet cold fog, and these streams produce complete circulation of the fog atmosphere in these chambers.

Refrigerating pipes 19 may be placed and used in this chamber along any of the walls; and the cold temperature of the chamber or chambers may be assisted or effected by this cold pipe surface through which a refrigerating fluid is passed, similarly as the temperature is kept down in the chambers 2.

The liquid to be atomized and converted to fog will be supplied to the pipes 18 and nozzles 17 as indicated by the drawings from the filter 12.

Apparatus of this kind can be advantageously used in fish and meat shops, and suitably placed in the shop so that the fish or other food can be seen by the customers.

The top of the cabinet is in the form of a window consisting of a plurality of parallel sheets of glass 20, which are spaced apart as shown. By this means the fogging of the glass surface is prevented; and the surface of the window is inclined so as to facilitate the fish or articles displayed being more easily seen by customers. The interior of the chamber 1 may be provided with electric lamps 21, by which they are illuminated; and these lamps may give a white or coloured light.

The back wall of the apparatus is provided with large openings or doorways for giving full and easy access to the interior of the chambers, which are normally closed by doors 22 and 23 respectively, and all these walls and doors will be of a non-conducting character of any appropriate kind.

When the apparatus is used for displaying and keeping or storing foodstuffs other than fish, such as animal flesh and fruit, in connection with which contact with water may be objectionable, the fog atmosphere may not be used, or may be used intermittently, so as to maintain a humid state of atmosphere, and so avoid a drying effect on the surface of the goods. In such a case the low temperature of the chambers may be maintained by the cooling pipes through which a refrigerating fluid is passed, as described.

What is claimed is:

1. Apparatus for displaying and keeping fish and other perishable substances, comprising in combination a display chamber having a window or windows above to enable the articles to be seen, having within it liquid atomizing means for producing an atmosphere of wet cold fog; a closed food storing chamber below the display chamber and separate from the same having within it liquid atomizing means for producing an atmosphere of wet cold fog, a refrigerating chamber for cooling the liquid prior to introduction as a wet cold fog by atomization into said display and storing chambers, and means directing the liquid to the refrigerating chamber after heat exchange between the wet cold fog and the substances in the display and storing chambers.

2. Apparatus for displaying and keeping fish and other perishable substances, comprising a display chamber above having a window or windows to enable the articles to be seen, having within it liquid atomizing devices; a food storing chamber directly below the display chamber, and separated from the same; and below the storing chamber, a refrigerator consisting of pipes or conduits through which a refrigerating fluid is passed, and to which liquid which falls to the bottom of the upper chamber is passed.

3. Apparatus for displaying and keeping edible substances, comprising a display chamber having a window or windows enabling the substances to be seen, and having within it liquid atomizing devices; a food storing chamber having within it liquid atomizing devices, a refrigerating chamber for cooling liquid refrigerant prior to introduction of the same by atomization into said display and storing chambers, and conduits leading from said display and storing chambers to said refrigerating chamber, for passage of liquid refrigerant after heat exchange of the same with the edible substances.

4. In an apparatus of the class described, a display chamber containing edible substances, a storing chamber containing edible substances, means for introducing an atomized liquid refrigerant into said display and storing chambers, a refrigerating chamber for cooling said liquid refrigerant prior to introduction into said display and storing chambers, and means for directing the liquid refrigerant after heat exchange with the edible substances into the refrigerating chamber for re-cooling.

5. In a device of the class described, a display chamber carrying edible products, cooling pipes and atomizing devices disposed therein, a storage chamber carrying edible products, cooling pipes and atomizing devices disposed therein, a refrigerant passing through said cooling pipes to maintain said display and storage chambers at low temperatures, a liquid refrigerant passing through said atomizing devices, a refrigerating chamber for cooling said liquid refrigerant prior to introduction of the same through said atomizing devices, and conduits leading from said display and storage chamber to said refrigerating chamber for passage of liquid refrigerant after heat exchange of the same with the edible products.

6. A display chamber containing edible products having cooling pipes and atomizing devices, a storage chamber containing edible products and having cooling pipes and atomizing devices therein, a liquid refrigerant passing through said atomizing devices, a refrigerating chamber having cooling pipes therein, and a refrigerant passing through the pipes of the display for maintaining said chambers at low temperatures, storage and refrigerating chambers, said refrigerating chamber being adapted for cooling the liquid refrigerant prior to introduction of the same into the atomizing devices, and conduits leading from said display and storage chambers to said refrigerating chamber for passage of liquid refrigerant after heat exchange of the same with the edible products in the display and storage chambers.

7. In an apparatus of the class described, a display chamber containing edible substances, means for introducing an atomized liquid refrigerant into said display chamber, a refrigerating chamber for cooling said liquid refrigerant prior to introduction into said display chamber, and means for directing the liquid refrigerant, after heat exchange with the edible substances, into the refrigerating chamber for recooling.

8. In an apparatus of the class described, a display chamber containing edible substances, cooling pipes in said display chamber for maintaining the same at predetermined temperature, means for introducing atomized liquid refrigerant into said display chamber for contacting with and acting upon said edible substances, a refrigerating chamber for cooling said liquid refrigerant prior to introduction into said display chamber, and means for directing the liquid refrigerant after heat exchange with the edible substances, into the refrigerating chamber for recooling.

MIKAIL TROFIM ZAROTSCHENZEFF.